Feb. 20, 1968      L. D. BURTON      3,370,297

INK DROPLET RECORDER WITH DROPLET INTERCEPTION CONTROL

Filed April 9, 1965

INVENTOR.
LOCKWOOD D. BURTON

BY *Arthur H. Swanson*

ATTORNEY.

United States Patent Office 3,370,297
Patented Feb. 20, 1968

3,370,297
INK DROPLET RECORDER WITH DROPLET
INTERCEPTION CONTROL
Lockwood D. Burton, Collingswood, N.J., assignor to Honeywell Inc., Minneapolis, Minn., a corporation of Delaware
Filed Apr. 9, 1965, Ser. No. 446,961
7 Claims. (Cl. 346—75)

This invention relates to signal apparatus, and more particularly to a direct writing signal recording system.

Subject matter shown but not claimed herein is shown and claimed in a copending U.S. application of Richard G. Sweet, Ser. No. 354,659, filed on Mar. 25, 1964.

It is an object of the present invention to provide an improved recording system as set forth and wherein direct ink recording is employed while obviating the necessity for a physical engagement between a stylus and the record member.

It is another object of the present invention to provide an improved recording system as set forth for direct ink recording and incorporating a provision for selectively intercepting the recording ink during a nonrecording period It is a further object of the present invention to provide an improved recording system as set forth for direct ink recording which is effective to permit a recording operation only when a recording medium is properly presented to the recording ink.

In accomplishing these and other objects, there has been provided, in accordance with the present invention, a recording instrument wherein a jet of writing fluid; e.g., ink, is caused to be issued from a recording nozzle in the form of a succession of tiny individual droplets which are directed toward the surface of a record member. As the individual droplets are formed, they are given an electrostatic charge which is a function of the instantaneous value of an input signal which is to be recorded and, then caused to pass between a pair of electrostatic deflection plates. As the charged droplets pass through the electric field, they are deflected from their normal path by an amount which is a function of the magnitude of the charge on each of the droplets and in a direction which is a function of the polarity of the charge on the individual droplets. A magnetic field producing means is selectively energized in response to an improper operation of a transport system for the record member to deflect the recording fluid into an intercepting catch basin or receptacle. The receptacle is arranged to return the intercepted fluid to the fluid supply for the recording nozzle.

A better understanding of this invention may be had from the following detailed description when read in connection with the accompanying drawings, in which.

Figure 1:
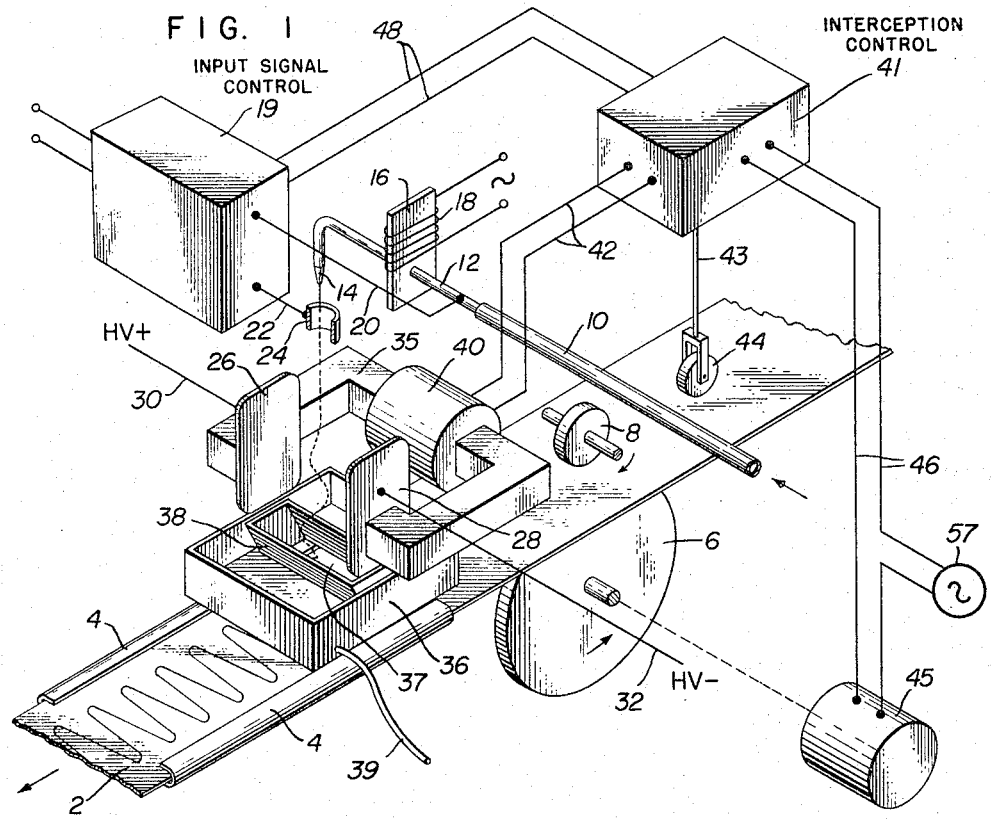
FIG. 1 is a perspective view of apparatus embodying and illustrating the present invention.

Referring now to the drawing in more detail, there is shown in FIG. 1 apparatus which illustrated the inventive concept constituting the present invention. This apparatus includes a record receiving member 2, such as a strip of record paper, which is arranged to be driven through a suitable paper guide 4 by means of a drive roller 6 and a pressure roller 8. Record writing fluid is supplied to the system through a tube member 10, a feed pipe 12 and a nozzle 14 under a hydrostatic pressure head of between 40 and 100 lbs. per square inch. The writing fluid, or ink, issues from the nozzle 14 in a jet which may be on the order of 1/1000 of an inch in diameter. Issuing thus from the nozzle, the jet has a natural tendency, due at least in part to surface tension of the fluid, to break up into a succession of tiny droplets. In order to assure that the droplets will be substantially uniform in dimension and frequency, means are provided for introducing regularly spaced varicosities in the issuing jet. These varicosities, or undulations in the cross-sectional dimension of the issuing jet stream, are made to occur at or near the natural frequency of the formation of the droplets. This frequency may typically be on the order of 120,000 per second. In the structure shown in FIG. 1 the varicosities are introduced into the issuing jet stream by vibrating the feed pipe 12, hence the nozzle 14, at the desired frequency. This is accomplished by means of a magnetostrictive driving element 16 which is excited by a suitable driving coil 18.

In accordance with this invention, the signals to be recorded are applied directly to the writing fluid In accomplishing this, it is assumed that the writing fluid, or ink, is itself electrically conductive. The signal to be recorded is applied to the instrument from an input signal control 19 over a first and second lead wire 20 and 22, respectively. The first lead wire 20 is connected to the feed pipe 12, if that feed pipe 12 is made of electrically conductive material. Otherwise the lead 20 is connected through the wall of the feed pipe 12 into engagement with the ink therein. The second lead wire 22 is connected to a tubular charging ring or electrode 24. The charging electrode 24 is positioned relative to the nozzle 14 such that the actual formation of the discrete droplet occurs within the region surrounded by the electrode 24. The input signal control 19 is effective to apply a signal to the lines 20 and 22 corresponding to an input signal to be recorded. Thus, as an individual droplet separates from the continuous stream of the ink supply, it carries with it an electrostatic charge which is proportional to the instantaneous value of the input signal at the instant of separation. Thus each droplet of ink or writing fluid will have its own unique charge characteristic.

These droplets are directed, at relatively high velocity, toward the surface of the record receiving member 2. In their path towards the surface of the record receiving member 2, the droplets are caused to pass between a pair of electrostatic deflecting electrodes or plates 26 and 28, respectively. These plates 26 and 28 are oppositely charged to a relatively high constant voltage. The deflecting plate 26 might, for example, be charged to a positive 8,000 volts through the lead 30, while the plate 28 might be charged to a negative 8,000 volts through the lead 32. This produces an electric field between the two plates having a total potential difference of 16,000 volts with the two plates spaced about one-half inch apart. As the individually charged droplets pass through the electric field thus produced, they are individually deflected from their straight line path by an amount which is a function of the magnitude of the charge on the particular droplet. The direction of the deflection will be determined by the polarity of the charge on the droplet relative to the electric field.

Since the charge on the deflection plates is constant and the signal to be recorded appears as a charge on the individual droplets, the frequency response characteristic of the recording instrument is not limited by the transit time of the droplets between the deflection plates. Since each droplet carries its own unique charge signal, the frequency response capability of the recording instrument is limited only by the frequency of the recurrence of the individual droplets. With the droplets occurring at the rate of 120,000 per second, it is apparent that the frequency response characteristic of the recorder approaches one-half of the recurrent frequency of the droplets themselves as a practical limit.

In FIG. 1, there is shown an auxiliary field producing structure arranged in combination with the deflecting plates 26 and 28. Specifically, a magnetic core element 35 is positioned with its ends adjacent to respective surfaces of the plates 26 and 28. Additionally, the ends of the core 35 are in a facing relationship to direct a magnetic field therebetween generally perpendicular to the path of the ink droplets. In other words, the magnetic field is arranged to extend across the space between the plates 26 and 28 and perpendicular thereto. The core 35 is electrically insulated from the plates to prevent a short-circuit for the high voltage deflection signal. Alternatively, the core ends may be positioned beneath the plates 26 and 28 and separated therefrom in order to avoid electrical insulating problems while still providing a magnetic field which is substantially perpendicular to the path of the droplets.

An ink intercepting receptacle or basin 36 is positioned beneath the plates 26 and 28 and the core 35. The basin 36 is provided with a slot 37 extending transversely to the record member 2 and enclosing the path of the droplets during recording. The slot 37 is arranged to be substantially longer than the maximum excursion of the ink droplets in response to the high voltage signal on the plates 26 ad 28. In other words, the slot 37 is arranged to allow the ink droplets to reach the recording member 2 during the recording operation. The slot 37 is provided with a circumferential wall 38 extending upwardly from the bottom of basin 36 to prevent ink held in the basin 36 from leaking out through the slot 37. The basin 36 is additionally provided with a drain pipe 39 to effect a drainage of the ink in the basin 36 for reuse in the recording operation. It is to be noted that other modifications of the positioning of the core 35, the plates 26 and 28 and the basin 36 may be utilized without departing from the scope of the present invention.

A coil 40 is wound on the core 35 to provide a magnetic field within the core 35. An energizing signal for the coil 40 is supplied by an interception control 41 over lines 42. The control 41 is arranged to respond to the movement of the recording member 2 by means of a pivoted arm 43 having a roller 44 rotatably mounted on one end thereof. The control 41 is also used to control an energizing signal over lines 46 to a motor 45 for driving the drive roller 6. The interception control 41 is, further, arranged to provide a control signal over lines 48 to the input control 19 to effect a fixed charging operation of the recording droplets. The aforesaid relationships are more clearly shown in the pictorial cross-sectional representation of FIG. 2.

Figure 2:
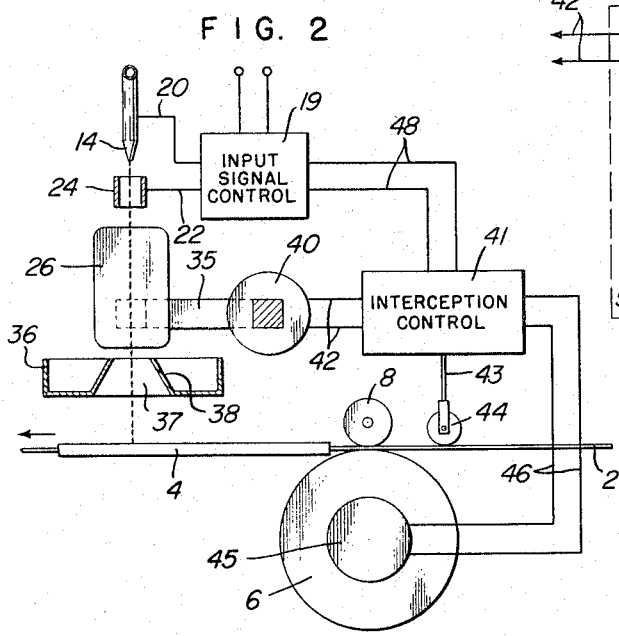
FIG. 2 is a side view in a partial cross-section of the apparatus shown in FIG. 1.
Figure 3:
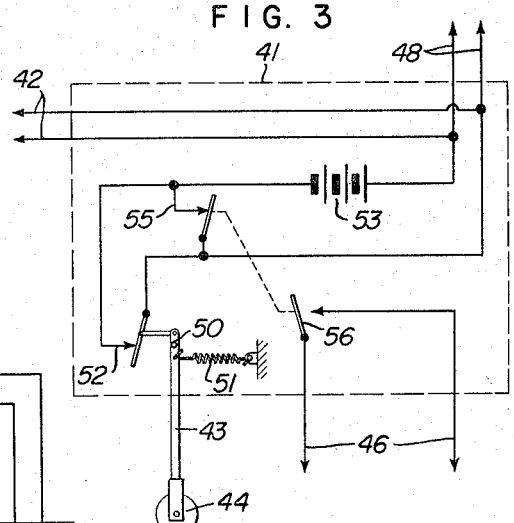
FIG. 3 is a schematic circuit diagram of a control circuit for use in effecting the operation illustrated in FIG. 1.

In FIG. 3, there is shown a schematic diagram for use as the interception control 41 shown in FIGS. 1 and 2. The arm 43 is pivoted at a fixed pivot 50 while a spring element 51 is arranged to bias the arm 43 into a predetermined position. In this position, the arm 43 is arranged to close a switch 52 which is positioned to cooperate with a switch actuating push lever mounted on the arm 43. The roller 44 is positioned in frictional contact with record member 2 and with a viscous coupling to the arm 43. Thus, the frictional force between the member 2 and the roller 44 is effective to drag the roller 44 in the direction of movement of the member 2 while the viscous coupling allows rotation of the roller 44. This direction of the drag of roller 44 is arranged to be opposite to the bias direction of the spring 51 and is effective to open the switch 52. Accordingly, when the member 2 is moving beneath the roller 44, the switch 52 is held in an open condition. The closed condition of switch 52 is effective to connect a D.C. supply 53 to lines 42 and 48 whereby the coil 40 and the input control 19 are energized.

A second switch 55 is electrically connected in parallel with switch 52. Switch 55 is mechanically interconnected with a third switch 56. The third switch 56 is arranged to connect an energizing source 57 through lines 46 to energize the drive motor 45 and provide drive control therefor. The interconnected operation of switches 55 and 56 is arranged to produce opposite effects therein. In other words, when switch 56 is opened switch 55 is closed and vice versa.

In operation, the interception control 41 is effective to function as an interlock means to prevent the recording droplets from reaching record member 2 when the proper conditions for recording are not present. Briefly, the record member 2 must be present and moving to prevent the ink droplets from piling up on the member 2 or the support 4, and the ink droplets must be intercepted if the member 2 is either not present or not moving. The roller 44 is effective to detect the movement of member 2 and to close the switch 52 if either the movement should stop, fall below a desired level, or the member 2 should disappear from beneath the roller 44. This last condition being a representation of either a break in the member 2 or the end of the member 2 having been reached. On the other hand, switch 55 is arranged to detect an open condition of switch 56 representative of a non-energized condition of drive motor 42.

The effect of the closure of either switch 52 or 55 is to apply an energizing signal from source 53 to the coil 40 and the input control 19. The energization of coil 40 is effective to establish a magnetic field across the space between the plates 26 and 28 as previously described. The energizing signal for the input control 19 is arranged to function as an auxiliary input signal to insure that the droplets from the nozzle 14 are charged, albeit to a constant polarity and magnitude. The movement of the charged droplets through the magnetic field is effective to impose a force on the droplets perpendicular to the magnetic field and in a direction depending on the polarity of the droplets and the direction of the magnetic field between the ends of the core 35 in accordance with Faraday's law. Thus, when the magnetic field is present, the charged droplets are deflected from their normal recording path and past the wall 38 into the basin 36. The wall 38 is advantageously positioned near to the normal recording path to allow a magnetic field of reasonable magnitude to deflect the droplets into the basin 36. The basin 36 is provided with a drain tube 39 to return the ink for reuse in the recording process. When the switches 52 and 55 are both opened as an indication of the proper conditions for recording, the coil 40 is deenergized and the auxiliary input signal is terminated at the input control 19 to allow a resumption of the normal recording process.

Accordingly, it may be seen that there has been provide, in accordance with the present invention, a direct ink recording system having means for selectively intercepting the recording ink during a non-recording interval characterized by the absence of a proper operation of a recording medium.

What is claimed is:

1. A direct writing recorder comprising means for forming a discontinuous stream of writing fluid in the form of a succession of discrete droplets and projecting said droplets toward a moving record member, means for electrostatically charging said discrete droplets in accordance with the instantaneous value of an input signal, electrostatic deflecting means arranged to deflect said droplets along a normal recording path in accordance with the charge carried by said droplets, magnetic field producing means arranged to subject said droplets to a magnetic field extending parallel to said recording path and selectively actuated means responsive to the operation of said record member and operative to energize said field producing means upon an improper operation of said record member whereby to produce a movement of said droplets induced by said magnetic field away from said normal recording path.

2. A direct writing recorder as set forth in claim 1 which includes an intercepting receptacle positioned adjacent to said normal recording path and in a non-interfering relationship therewith, said receptacle being operative to intercept said droplets upon an energization of said field producing means and to return said intercepted droplets for reuse by said means for forming said droplets.

3. A direct writing recorder as set forth in claim 1 wherein said selectively actuated means includes record member movement sensing means in frictional contact with said moving record member to induce a movement of said movement sensing means, first switch means, an energizing signal source for said magnetic field producing means, circuit means connecting said signal source to said field producing means through said switch means, and means interconnecting said movement sensing means with said switch means, whereby said switch means is held in an electrically open state during the proper operation of said record member by the frictional force acting on asid movement sensing means by said record member.

4. A direct writing recorder as set forth in claim 3 wherein said selectively actuated means includes a second switch means connected in parallel with said first switch means, a drive control means, and means interconnecting said second switch means with said drive control means whereby said second switch means is operated into an electrical state opposite to that of said drive control means and said field producing means is energized when said drive control means is deenergized.

5. A direct writing recorder as set forth in claim 3 wherein said selectively actuated means includes circuit means connecting an energizing signal for said field producing means as an auxiliary input signal for said means for electrostatically charging said droplets.

6. A direct writing recorder comprising means for forming a discontinuous stream of writing fluid in the form of a succession of discrete droplets and projecting said droplets toward a moving record member, means for electrostatically charging said droplets in accordance with the instantaneous value of an input signal, electrostatic deflecting means arranged to deflect said droplets along a normal recording path in accordance with the charge carried by said droplets, auxiliary field producing means arranged to subject said droplets to an auxiliary field operative to deflect said droplets away from said recording path and selectively actuated means responsive to the operation of said record member and operative to energize said field producing means upon an improper operation of said record member whereby to produce a movement of said droplets in response to said auxiliary field away from said normal recording path.

7. A direct writing recorder as set forth in claim 6 which includes an intercepting receptacle positioned adjacent to said normal recording path and in a non-interfering relationship therewith, said receptacle being operative to intercept said droplets upon an energization of said field producing means.

References Cited

UNITED STATES PATENTS 3,287,734  11/1966  Kazan _____ 346—75 X
3,298,030  1/1967  Lewis et al. _____ 346—75

OTHER REFERENCES

"Fast Oscillograph Squirts Ink," Electronic Design, Oct. 11, 1963, pp. 29–29.

RICHARD B. WILKINSON, *Primary Examiner.*

J. W. HARTARY, *Assistant Examiner.*